INVENTOR
Colin D. Patterson
Peter J. Jefferson
BY Muir, Marshall, MacRae & Lamb
PATENT AGENT INVENTOR
Colin D. Patterson
Peter J. Jefferson
BY
Weir, Marshall,
MacRae & Lamb
PATENT AGENT United States Patent Office 3,425,037

Patented Jan. 28, 1969

3,425,037

INTERRUPT COMPUTER SYSTEM

Colin D. Patterson, Ottawa, Ontario, Canada, and Peter J. Jefferson, Horsham, England, assignors to Computing Devices of Canada Limited, Ontario, Canada Filed Apr. 25, 1966, Ser. No. 544,957
Claims priority, application Canada, Mar. 29, 1966, 956,443

U.S. Cl. 340—172.5 9 Claims
Int. Cl. G11b *27/36*

ABSTRACT OF THE DISCLOSURE

A data handling system having a central apparatus and a plurality of peripheral devices which require the attention of the central apparatus and means to determine which of the devices has the higher priority. A common transmission line connects the peripheral devices to the central apparatus. Upon receiving a signal each peripheral device simultaneously begins to generate a respective assigned priority signal on the common transmission line. Each device monitors the signals on the transmission line and further generation of the respective priority signal is inhibited immediately when a higher priority signal is detected on the monitored transmission line. Only the peripheral device with the highest priority signal completes the generation of its signal.

Figure 2:
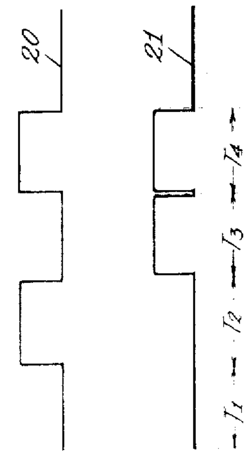

This invention relates to a data handling system, and in particular it relates to a data handling system having means to transmit data or do other operations in the order of an assigned priority.

In the handling of data, one central data receiving apparatus often has a number of peripheral devices which have data to be transmitted to the data receiving apparatus. The peripheral devices are normally connected to the data receiving apparatus by a common connecting means such as a data bus. That is, the peripheral devices are normally connected in parallel to a common input of the data receiving apparatus. When more than one peripheral device has data to transmit, some arrangement must be made for selecting one peripheral device at a time for transmission of its data along the common connection means to the receiving apparatus. It is known to have a system where the data receiving apparatus selects each peripheral device in a predetermined time sequence, and requires that particular peripheral device to transmit its data in a predetermined time interval.

In many instances the data at one peripheral device is more important than the data at other peripheral devices and it is appropriate to give a priority to the data at each peripheral device. This means that the data may be transmitted in the order of importance and consequently such an arrangement is very desirable if not essential to efficient operation. Systems for handling data in this manner are known and generally comprise means at each peripheral device for generating a priority signal representing the priority assigned to the data at that particular peripheral device, and means at the data receiving apparatus for initiating the generation of the priority signal of each device in a predetermined sequence. The data receiving apparatus stores the priority signal of each device, compares the priority signals, selects the peripheral device which generated the signal of highest priority and generates a command for that peripheral device to transmit its data.

It will be seen that considerable time is consumed as the peripheral devices each transmit their priority signal one after the other, each in response to a separate signal from the central apparatus which initiates the generation of the respective priority signal. Where a number of peripheral devices are connected to a data receiving apparatus, the time taken to establish which peripheral device has the highest priority may be excessive. In addition such an arrangement may involve a disproportional or excessive amount of equipment when a number of priority signals are involved. For example, in a system where sixty-four levels of priority were available for use, the equipment necessary to initiate generation of a priority signal from each peripheral device in sequence, store the priority signals, compare the signals, and select the peripheral device which generated the highest priority signal, may be excessive.

It is therefore an object of this invention to provide a data handling system including a central apparatus and a plurality of peripheral devices in which the peripheral device having the highest priority may be quickly determined.

It is another object of this invention to provide an improved priority determination means for determining the highest priority in a plurality of peripheral devices which involves a minimum of equipment.

It will be clear that the present invention pertains to a system for determining which of a plurality of peripheral devices connected to a central apparatus has the highest priority. That is, the present invention pertains to a data handling system having a priority interrupt facility. While a common purpose of determining which peripheral device is of highest priority is for the transmission of data in a desired priority sequence, it is apparent that determining which device is of highest priority may be for a purpose other than such data transmission.

This invention is particularly suitable for use in a priority interrupt computer system. A digital computer may have a number of peripheral devices associated with it to supply data to the computer and to receive data from the computer. The data at each device may have a different priority assigned to it and it may be important to interrupt the computer operation for the transmission of data from a peripheral device to the computer according to the priority of the data waiting for transmission at the different peripheral devices. Alternately, it may be important for a peripheral device to interrupt computer operation according to a priority assigned to the device for a purpose which is not primarily the transmission of data. The invention will subsequently be described in connection with such a priority interrupt system.

It is an object of this invention to provide a priority interrupt computer system of novel design for rapid priority determination between a plurality of peripheral devices connected to the computer.

Figure 1:
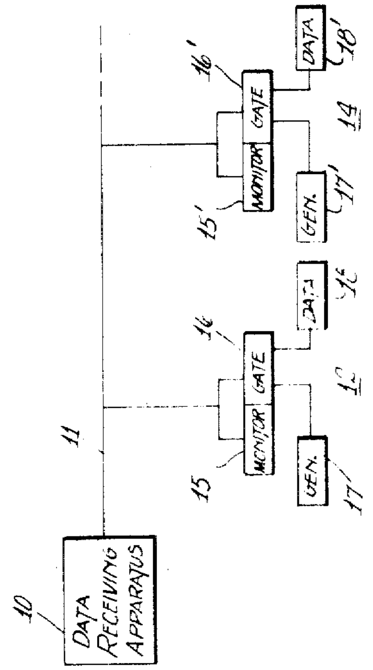
Figure 3:
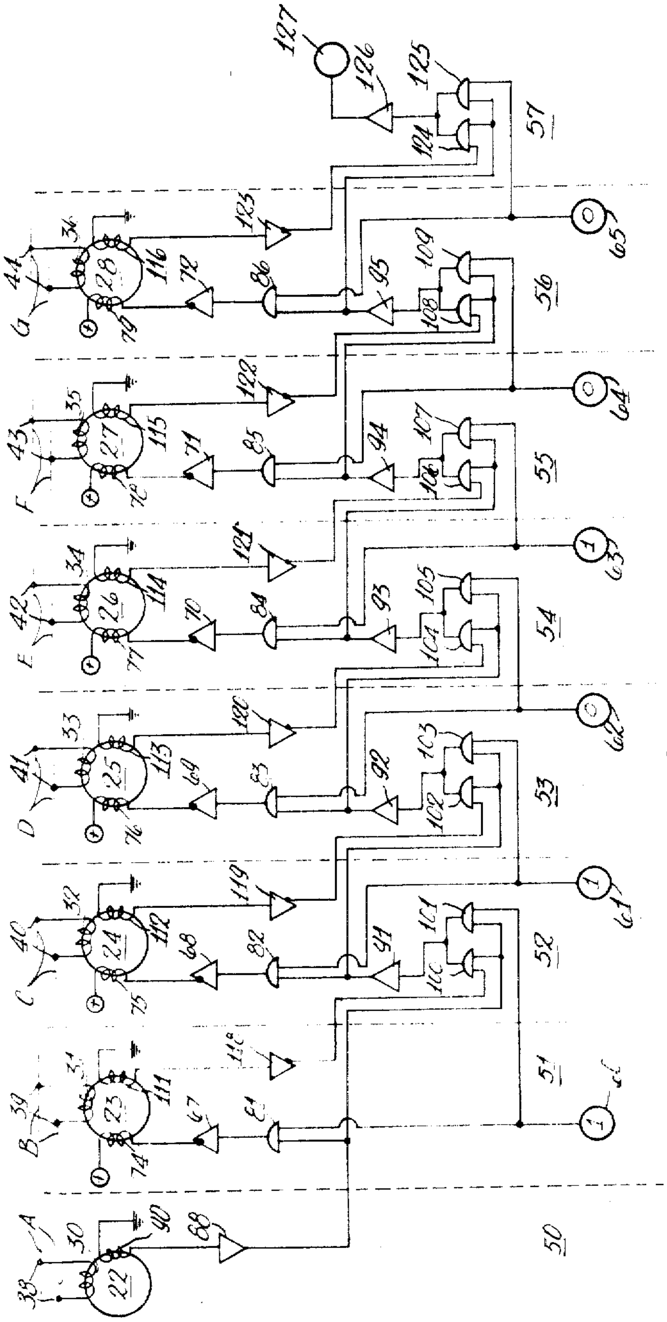

These and other objects and advantages will appear from the following description taken in conjunction with the accompanying drawings, in which:

FIGURE 1 is a simplified block diagram showing a basic version of the invention, FIGURE 2 is a waveform diagram useful in explaining the operation of the invention, FIGURE 3 is a schematic diagram of one form of circuitry suitable for a peripheral device of this invention.

Briefly, the present invention is for a data handling system comprising a central apparatus, a plurality of peripheral devices each having a condition requiring the attention of the central apparatus and a priority representing said condition, common connection means connecting the peripheral devices with the central apparatus, a priority signal generating means in each peripheral device for providing on the common connection means a priority signal representing the condition at the respective device, means for initiating operation of the priority signal generating means in each peripheral device, monitoring means in each peripheral device for monitoring the priority signals on the common connection means and comparing the monitored signals with the priority signal of that device, and means in each said peripheral device responsive to the monitoring means of that device for inhibiting the signal generating means of that device with determination by the monitoring means of a higher priority signal on said common connection means.

In the simplified block diagram of FIGURE 1, block 10 represents a data receiving apparatus having an input bus 11 which is common to a plurality of peripheral devices. Two peripheral devices are represented at 12 and 14. The peripheral device 12 comprises a monitor 15, a gate 16, a priority code signal generator 17, and a data transmitting means 18. The peripheral device 14 comprises monitor 15', gate 16', generator 17' and data transmitting means 18'.

The input bus 11 could comprise a single transmission line over which data is passed as a single train of pulses (i.e., serial transmission), or the input bus 11 could comprise a plurality of transmission lines, for example one transmission line for each significant bit of data, and bits of data representing different significant values may be transmitted simultaneously (i.e., parallel transmission). Also, it is possible that some combination of serial and parallel transmission might be used. In any case, the connection means between the input to the data receiving apparatus 10 and the peripheral devices 12 and 14 is common and can be used for transmission of data by only one peripheral device at a time.

In the operation of the system, each peripheral device simultaneously begins to generate a code signal representing an assigned priority. The initiation of code signal generation may be responsive to a timing arrangement or, more conveniently, it may be responsive to a trigger signal generated at data receiving apparatus 10 and placed on bus 11. Thus, a trigger signal may actuate gates 16 and 16' and initiate generation of the respective code signals by generators 17 and 17'. The priority code signals appear on bus 11. Monitor 15 compares the priority code signals on bus 11 with the priority code signal generated by generator 17. Similarly, monitor 15' compares the priority code signals on bus 11 with the priority code signal generated by generator 17'. If monitor 15 finds a signal of higher priority on bus 11, it inhibits further generation of the priority code signal by generator 17. Similarly, if monitor 15' finds a signal of higher priority on bus 11, it inhibits further generation of the priority code signal by generator 17'. Perhaps reference to FIGURE 2 will clarify the operation.

Referring now to FIGURE 2, there are shown two pulse trains 20 and 21 which may be divided into time periods $T_1$, $T_2$, $T_3$, and $T_4$ as shown. The time period $T_4$ represents the period of least significance. That is, time period $T_4$ may contain a bit of information that is the least significant while time period $T_1$ may contain a bit of information that is the most signficant. If the time periods $T_4$, $T_3$, $T_2$ and $T_1$ represent for example, 1, 2, 4 and 8 respectively, then pulse train 20 would represent a priority level of 5 while pulse train 21 would represent a priority level of 3. Thus, it will be seen that a pulse train having a pulse in time period $T_1$ would represent a higher priority level than any pulse trains having no pulse in time period $T_1$.

Now, suppose generator 17 is arranged to begin to generate pulse train 20 when a trigger signal is received, and generator 17' is arranged to begin to generate pulse train 21 when the same trigger signal is received. These pulse trains are considered as beginning with time period $T_1$ and in this period neither generator 17 nor generator 17' generates a pulse. In time period $T_2$ generator 17 generates a pulse but generator 17' does not. Monitor 15 compares the signal on bus 11 (which has a pulse generated by generator 17) with the signal generated by generator 17, and because it finds a pulse in both places it does nothing. Monitor 15' compares the signal on bus 11 with the signal generated by generator 17', and because it finds a pulse on bus 11 and none generated by 17' it inhibits further generation of pulse train 21 by generator 17'. Thus, while generator 17' is prepared to generate pulses in time periods $T_3$ and $T_4$ it is inhibited from generating them or alternately it is effectively inhibited from generating the pulses by inhibiting the transmission of the pulses to bus 11. It is intended that the inhibiting of generation of a priority signal should include the inhibiting of the transmission of the signal on the data bus.

It will be seen that the peripheral device having the highest priority level code signal continues to generate its code signal until it is completed. When this is done the peripheral device recognizes it has the highest priority and may be placed in condition to transmit its data or to perform whatever alternate action is required. Peripheral devices having a lower priority level code signal are inhibited from completing their code signal generation on bus 11. In this manner a peripheral device which does not complete its code signal recognizes that another device has a higher priority and it is prevented by its gate from interrupting.

It will be seen that a large number of peripheral devices may be used without substantially increasing the time required to determine which peripheral device has the highest priority level.

The system described employed priority code signals in serial form, that is the priority code signal was in the form of pulse train. It will be apparent that parallel transmission lines could be used, that is one transmission line could be used for each level of significance in the priority code signal. Such a system is described in connection with FIGURE 3.

Referring now to FIGURE 3, the circuit diagram is typical of the portion of circuitry at a peripheral device which is involved in the determination of priority. Additional circuitry which might be required for the actual data transmission is not shown. The circuit of FIGURE 3 is adapted for use in a computer system and will be described with such a background.

The computer, which may be considered as a central apparatus or as a data receiving apparatus, is connected to a plurality of peripheral devices by a data bus which includes at least seven balanced-pair transmission lines. These are designated A, B, C, D, E, F and G. The peripheral device includes seven pulse transformers 22–28 which may be used to pass pulses in a receiving or sending direction. Transformers 22–28 have respective windings 30–36, and each winding 30–36 is connected to respective terminals 38–44. The terminals 38 are connected across the balanced pair transmission line A, terminals 39 are connected across transmission line B, and so on as shown. The use of balanced-pair transmission lines, properly terminated, with coupled pulse transformers in the manner described reduces ground noise and other transients.

For convenience of description, the FIGURE 3 circuit diagram has been shown as having eight portions 50–57 separated by dashed lines. The left portion 50 is connected at terminals 38 to transmission line A which carries the interrupt strobe or interrupt pulse originated by the cmputer when it has completed a major command or completed a predetermined portion of a command. As explained before, this indicates the computer is available for interruption.

The portions 51–56 of the circuit are connected at terminals 39–44 respectively to transmission lines B to G which carry the binary bits representing the priority code signal. The bits representing the priority code signal of the particular device shown are applied at inputs 60–65. Input 60 has the most significant bit and the order of significance decreases to input 65 which has the least significant bit.

In each of the portions 51–56 there is a respective one of data bus driving amplifiers 67–72, and each amplifier has an output connected to a respective one of windings 74–79 on transformers 23–28 as shown. Amplifiers 67–72 provide an inverted output. That is, there is a positive voltage at the output of these amplifiers due to the positive supply connected to the respective winding 74–79, and this positive voltage is dropped when the amplifier receives a positive input from the respective gate 81–86. Thus, the amplifiers 67–72 provide an inverted output, but the current flow caused by this inverted output will in turn cause a positive pulse on the respective transmission line as a result of the respective pulse transformers.

The inputs to amplifiers 67–72 come from a respective one of AND gates 81–86. Each of gates 81–86 has a first and a second input. The first input of gate 81 is connected to the output of an amplifier 88 whose input is connected to a winding 90 on transformer 22. The second input of gate 81 is connected to input 60.

In portions 52–56, the first input of each of gates 82–86 is connected to a respective one of amplifiers 91–95. The input of each amplifier 91–95 is connected in parallel to a pair of AND gates. The amplifiers 91–95 may be referred to as dual gate amplifiers. Thus, the input of amplifier 91 is connected to gates 100, 101; the input of amplifier 92 is connected to gates 102, 103; and the input of amplifiers 93, 94 and 95 are connected to 104, 105 and 106, 107 and 108, 109 respectively. Each of the gates 100–109 has a first and a second input.

Each transformer 23–28 has a respective one of windings 111–116 which is connected to an input of a respective one of data bus receiving amplifiers 118–123. The amplifiers 118–123 are, in fact, inverters—that is they provide an inverted output. The output of each of amplifiers 118–122 is connected to the first input of gates 100, 102, 104, 106 and 108 respectively as shown. The second input of gate 100 and the first input of gate 101 are connected to the output of amplifier 88. The second input of gate 102 and the first input of gate 103 are connected to the output of amplifier 91. This is the same for the gates in the portions 54–56 where an input of each of the pair of gates in that portion is connected to the output of the one of the dual gate amplifiers 92, 93 and 94 which is in the preceding portion. The remaining inputs of the second gates 101, 103, 105, 107 and 109 are connected to inputs 60–64 respectively in the preceding portion of the circuit.

The right hand portion 57 of the schematic diagram shows an output circuit having a pair of gates 124 and 125 each with a first and second input. The first input of gate 124 is driven by the output of amplifier 123. The second input of gate 124 and the first input of gate 125 are driven by the output of amplifier 95. The second input of gate 125 is connected to input 65. The outputs of gates 124 and 125 are connected in parallel as an input to an amplifier 126 which provides an output at terminal 127.

In describing the operation of the system positive logic is used. Transmission of a pulse represents a one in the priority signal, and a one has a higher priority level than a zero. For example, a binary number 011100 representing a priority level would be of a higher level than binary number 011000. Those skilled in the art will be aware that negative logic could easily be used if necessary for any reason.

The general operation will now be described with reference to FIGURE 3. When the peripheral device of FIGURE 3 requires the attention of the computer, the assigned priority bits will be available at inputs 60–65. When an interrupt strobe is originated by the computer, it will appear on winding 90, be amplified by amplifier 88, and provide a qualifying input to the first input of gate 81 as well as the second input of gate 100 and the first input of gate 101. If input 60 has a one bit there will be two qualifying inputs to gate 81 resulting in an inverted pulse at winding 74 which transformer 23 couples to transmission line B. Thus, in response to the interrupt strobe, the one bit at input 60 results in a positive pulse on transmission line B. If input 60 has a zero bit, gate 81 will not pass any signal to amplifier 67.

In circuit portion 52 the interrupt strobe has provided a qualifying signal at one input of each of gates 100 and 101. Considering first the other input of gate 100, if there is no pulse on the transmission line B, and no signal developed on winding 111, the inverted output from amplifier 118 will be high to provide a qualifying signal to the first input of gate 100. Thus, the strobe signal and the signal from amplifier 118 would operate gate 100 to provide an output from amplifier 91 which, in turn, provides a qualifying signal at the first input of gate 82 and also at the second input of gate 102 and the first input of gate 103. On the other hand, if there is a signal on the transmission line B, then there will be no qualifying signal at the first input of gate 100.

Considering now the other input of gate 101, if there is a high priority bit (a one) at input 60, then gate 101 will have two qualifying signals and this will result in an output from amplifier 91.

A qualifying signal at both inputs of gate 82 will provide an inverted output on winding 75 and in consequence an output pulse on transmission line C.

The operation is similar in the remaining portions of the circuit. It should be noted that when one of the dual gate amplifiers 91–95 does not provide an output, there is not only no signal transmitted by that portion of the circuit in which the particular amplifier is but also there can be no signal transmitted on the data bus transmission lines by any portion of less significance. For example, if amplifier 91 has no output there will be no qualifying signal at the second input of gate 102 or the first input of gate 103. As neither gate 102 nor 103 can operate there will be no output from amplifier 92. Similarly there will be no output from amplifiers 93, 94, 95 or 126.

The operation may be clarified by considering a specific example where a priority of 110100 is assigned to the FIGURE 3 peripheral device and where there is another peripheral device which has a lower priority represented by binary number 110011.

When an interrupt strobe is received, gate 81 will have two qualifying signals, one from the strobe and one from input 60. This will result in a signal being transmitted on the transmission line B. Both the FIGURE 3 device and the other peripheral device will generate similar signals on this transmission line B.

In circuit portion 52, the signal developed at winding 111 will result in no qualifying signal at the first input of gate 100, but there will be qualifying signals at both the first and second inputs of gate 101. Gate 101 will operate and amplifier 91 will provide an output. This will provide a qualifying signal at the first input of gate 82 while input 61 provides the other qualifying signal. A signal will therefore be transmitted on transmission line C. Both the FIGURE 3 device and the other peripheral device will generate signals on this transmission line C.

Circuit portion 53 has a low priority bit at input 62. Gate 103 is operated by the output from amplifier 91 and by the signal from input 61 so that amplifier 92 provides an output. However the bit at input 62 does not cause gate 83 to operate and no signal is transmitted on transmission line D. The FIGURE 3 device and the other peripheral device are again the same, but in this instance neither transmits a signal on this transmission line D.

In circuit portion 54, there is a high priority bit at input 63. The other peripheral device has a low priority bit at the corresponding input. There is no signal picked up at winding 113 and the first input of gate 104 therefore has a qualifying input. The second input of gate 104 also has a qualifying input from amplifier 92. As a result amplifier 93 provides an output, and this output along with the signal from input 63 operates gate 84 to provide a signal on transmission line E. The other peripheral device does not generate a signal on this transmission line E. This indicates the other device has a lower priority.

In circuit portion 55 there is no qualifying signal at the first input of gate 106 because a signal was transmitted on the transmission line E. However, gate 107 operates because of the signals from amplifier 93 and from input 63. Consequently, the amplifier 94 provides an output. Because of the low priority bit at input 64, gate 85 does not operate and no pulse is generated on transmission line F.

Considering now the other peripheral device at a circuit portion corresponding to portion 55, the gate corresponding to gate 106 cannot operate because of the signal on transmission line E. The gate corresponding to gate 107 cannot operate because the input corresponding to input 63 is of low priority. Therefore the amplifier corresponding to amplifier 94 does not provide an output. As was previously explained, the other dual gate amplifiers (corresponding to amplifiers 95 and 126) will not provide any output. In other words, the other peripheral device cannot generate priority signals on the transmission lines F or G.

The FIGURE 3 device continues to operate. No signal is provided on the transmission line G because of the low level bit at input 65. The amplifier 95, however, provides an output which qualifies the second input of gate 124. The first input of gate 124 receives a qualifying signal from amplifier 123 because there is no signal picked up by winding 116. Thus, amplifier 126 provides an output at terminal 127 indicating that the peripheral device has the highest priority of any device which placed a priority signal on the data bus. This signal may be used to initiate data transmission to the computer or it may be used for another purpose.

If a peripheral device does not have an output at a corresponding terminal 127, it indicates another device has a higher priority.

It will be seen that all the peripheral devices which begin generating a priority signal will have their generation or transmission inhibited at some point before it is completed with the exception of the device having the highest priority. At the end of the priority interrupt transmission period each peripheral device will be in condition indicative of whether it has the highest priority or not. It will also be apparent that the priority signal on the data bus will be that of the peripheral device having the highest priority. In the example just considered where the priority signals were 110100 and 110011, the lower priority device would be inhibited from transmitting (i.e., from generating) the last two bits. Thus the signal on the data bus would be the simultaneous resultant of the priority signals placed on the data bus as follows:

| | |
|---|---|
| 110100 | (higher priority) |
| 110011 | (lower priority) |
| 110100 | (resultant) |

In the foregoing description of the system for priority resolution, no mention has been made of time delays in amplifiers or of the time taken for propagation between peripheral devices. In actual practice time delays in amplifiers are not necessarily identical and the physical length of the data bus between peripheral devices will introduce finite delays in signal propagation. This will place a limit on the permissible separation of peripheral devices.

It is believed that a novel system for rapid priority determination between a plurality of peripheral devices has been described.

We claim:

1. A data handling system comprising:

a central apparatus, a plurality of peripheral devices each having a condition requiring the attention of the central apparatus and a priority representing said condition, common connection means connecting said peripheral devices with said apparatus, a priority signal generating means in each said peripheral device for providing on said common connection means a priority signal representing said condition at the respective device, means for initiating operation of said priority signal generating means in each said peripheral device, monitoring means in each said peripheral device for monitoring the priority signals on said common connection means and comparing the monitored signals with the priority signal of that device, and means in each said peripheral device responsive to the monitoring means of that device for inhibiting the signal generating means of that device with determination by the monitoring means of a higher priority signal on said common connection means.

2. A data handling system as defined in claim 1 in which the means for initiating operation of said priority signal generating means comprises:

signal generating means at said central apparatus for generating a signal indicating the control apparatus is available to attend to the peripheral device having the highest priority of all the peripheral devices.

3. A data handling system as defined in claim 2 in which the common connection means includes a single transmission line for the priority signal and the signal generating means generates priority signal comprising a series of pulses.

4. A data handling system as defined in claim 2 in which a common connection means is a data bus comprising a plurality of transmission lines, one transmission line being provided for each significant bit in the priority signal.

5. A data handling system comprising:

a data processing apparatus, a plurality of peripheral devices each having data for transmission to said apparatus and a priority for transmission of the respective data, common connection means connecting said peripheral devices to said apparatus, signal generating means at said apparatus for generating a signal indicating the apparatus will receive data from the peripheral device with the highest priority, a priority signal generating means in each said peripheral device for generating a priority signal representing the priority for transmission of data at the respective device, said priority signal generating means at each peripheral device being responsive to said signal indicating the apparatus will receive data, for initiating generation on said common connection means of the respective priority signal, monitoring means in each said peripheral device for monitoring the priority signals on the common connection means and comparing the monitored priority signals with the priority signal of the respective device, and means in each said peripheral device responsive to said monitoring means in the respective device for inhibiting the respective priority signal generating means with determination by the monitoring means of a higher priority signal on said common connection means.

6. An electronic computer system having an interrupt facility and comprising:

an electronic computer, a plurality of peripheral devices each including means for generating a priority signal, common connection means connecting said peripheral devices to said computer, generating means in said computer for generating at intervals a signal calling for initiation of priority signal generation by said peripheral devices, monitoring means in each said peripheral device for monitoring priority signals on said common connection means generated by peripheral devices and comparing the monitored signals with the priority signal generated at the respective device, and means in each said peripheral device responsive to the respective monitoring means for inhibiting the priority signal generation of that device when a higher priority signal is monitored.

7. A data handling system having an interrupt facility comprising:

a central apparatus including means for generating at spaced intervals an interrupt strobe indicating the apparatus is available for interruption, a plurality of peripheral devices each having a condition requiring interruption of said central apparatus and each having a priority for interruption represented by a binary number of $n$ bits where $n$ is a number greater than one and where each bit represents one of two states in the set comprising a high priority and a low priority, a common connection means connecting said peripheral devices with said central apparatus and comprising a data bus having at least $n+1$ transmission lines for the priority interrupt facility, the transmission line $n+1$ being coupled to said means for generating in interrupt strobe, the transmission line $n$ being provided for the most significant binary bit and the remaining transmission lines represented by the descending sequence $n-1$ . . . being provided for the remaining bits in decreasing order of significance, said peripheral devices each comprising at least $n$ circuit portions, the $n$th circuit portion having an input for receiving the most significant binary bit representing the priority at the respective device, the remaining circuit portions in the descending sequence $n-1$ . . . each having an input for receiving the remaining binary bits in descending order of significance at the respective device, each said circuit portion having a first AND gate with a first and second gate input and a first gate output, and means coupling said first gate output to a respective one of said transmission lines $n$, $n-1$, . . . , connection means in each circuit portion connecting the input for receiving the binary bit to said second gate input for applying thereto a qualifying input with the presence of a bit in the high priority state.

coupling means coupling the transmission line $n+1$ to said first gate input in the $n$th circuit portion for applying thereto a qualifying input when said interrupt strobe is present on said transmission line $n+1$, the means coupling said first gate output of said $n$th circuit portion to the transmission line $n$ generating a pulse on said transmission line $n$ in response to two qualifying inputs at said first and second gate inputs of said $n$th circuit portion, each said circuit portion in the descending sequence $n-1$ . . . having a second and a third AND gate with third and fourth, fifth and sixth gate inputs respectively and second and third gate ouputs respectively, said second and third gate outputs being connected together to form a first common output, means in each circuit portion in the descending sequence $n-1$ coupling said first common output to said first gate input for applying thereto a qualifying input with operation of one of said second and third AND gates, inverter means for each circuit portion in the descending sequence $n-1$ having an input coupled to the transmission line associated with the preceding circuit portion and an output coupled to said third gate input for providing a qualifying input thereto in the absence of a pulse on the said transmission line associated with the preceding circuit portion, connection means for each circuit portion in the descending sequence $n-1$ connecting said first gate input of the preceding circuit portion with said fourth and fifth gate inputs for providing a qualifying input thereto as a qualifying input is applied to said first gate input of the preceding circuit portion, connection means for each circuit portion in the descending sequence $n-1$ connecting the input for receiving the binary bit of the preceding circuit portion with said sixth gate input for applying thereto a qualifying input with the presence in the preceding circuit portion of a bit in the high priority state, a final circuit portion having fourth and fifth AND gates with seventh and eighth, ninth and tenth gate inputs and fourth and fifth gate outputs, said fourth and fifth gate outputs being connected together to form a second common output, inverter means having an input coupled to the transmission line associated with the last circuit portion in the descending sequence $n-1$ and an output coupled to said seventh gate input for providing thereto a qualifying input in the absence of a pulse on said transmission line associated with the last circuit portion in the descending sequence $n-1$, connection means for said final circuit portion connecting said first gate input of the last circuit portion in the descending sequence $n-1$ with said eighth and ninth gate inputs for providing thereto a qualifying input as a qualifying input is applied to said first gate input of the last circuit portion in the descending sequence $n-1$, connection means for said final circuit portion connecting the input for receiving the binary bit in the last circuit portion of the descending sequence $n-1$ with said tenth input gate for applying thereto a qualifying input with the presence in the said input for receiving the binary bit in the last circuit portion of the descending sequence $n-1$ of a bit in the high priority state, said second common output providing a signal with operation of one of said fourth and fifth AND gates indicating the respective peripheral device has a high priority.

8. A data handling system as defined in claim 7 in which $n$ is six.

9. A data handling system as defined in claim 7 in which said plurality of peripheral devices does not exceed in number $2^n$.

References Cited

UNITED STATES PATENTS

| | | | |
|---|---|---|---|
| 3,239,819 | 3/1966 | Masters | 340—172.5 |
| 3,283,306 | 11/1966 | Patrusky | 340—172.5 |
| 3,333,252 | 7/1967 | Shimabukuro | 340—172.5 |

PAUL J. HENON, *Primary Examiner.*

RAULFE B. ZACHE, *Assistant Examiner.*